United States Patent [19]

Olson et al.

[11] Patent Number: 5,128,284
[45] Date of Patent: Jul. 7, 1992

[54] PREPARATION OF LANTHANUM CHROMITE POWDERS BY SOL-GEL

[75] Inventors: William L. Olson, Elk Grove Village, Ill.; Beili Li; Jean Yamanis, both of Morris Township, Morris Coumty, N.J.

[73] Assignee: Allied-Signal Inc., Morris Township, Morris County, N.J.

[21] Appl. No.: 715,206

[22] Filed: Jun. 14, 1991

Related U.S. Application Data

[60] Division of Ser. No. 515,787, Apr. 25, 1991, Pat. No. 5,061,402, which is a continuation of Ser. No. 300,013, Jan. 23, 1989, abandoned, which is a division of Ser. No. 111,907, Oct. 23, 1987, Pat. No. 4,830,780.

[51] Int. Cl.⁵ .............. C04B 35/52; C04B 35/16; C04B 35/50; C03C 3/00
[52] U.S. Cl. .................. 501/12; 501/100; 501/101; 501/127; 501/132; 501/135; 501/152; 252/518; 252/521; 423/263
[58] Field of Search .............. 501/12, 97, 100, 98, 501/101, 126, 127, 132, 135, 152; 252/512, 521, 518; 423/263, 593, 595, 596

[56] References Cited

U.S. PATENT DOCUMENTS

| | | | |
|---|---|---|---|
| 3,893,821 | 7/1975 | Davies et al. | 29/182.5 |
| 3,922,236 | 11/1975 | Dougins et al. | 252/514 |
| 3,974,108 | 8/1976 | Staut et al. | 252/521 |
| 4,672,046 | 6/1987 | Sawamura et al. | 501/98 |
| 4,687,055 | 8/1987 | Hunold et al. | 423/344 |
| 4,699,890 | 10/1987 | Matsui | 501/98 |

FOREIGN PATENT DOCUMENTS 8600528  9/1986  European Pat. Off. .

Primary Examiner—William R. Dixon, Jr.
Assistant Examiner—Michael Marcheschi
Attorney, Agent, or Firm—Frank S. Molinaro; Harold N. Wells

[57] ABSTRACT

This invention relates to a process for the preparation of a crystalline compound having an empirical formula $LaCr_xA_{1-x}O_4 \cdot yH_2O$ where A is a metal selected from the group consisting of Mg, Sr, Ca and Ba, x ranges from 0.99 to about 0.7 and y ranges from 0 to 0.15. The process comprises adding a solution of the appropriate metal salts to a solution of ammonium hydroxide thereby precipitating a hydroxide gel intermediate, which is dried and calcined in air to yield the resultant crystalline compound which has a huttonite structure. Additionally, this invention relates to a process for the preparation of a ceramic powder having the empirical formula $LaCr_xA_{1-x}O_3$, where A is a metal selected from the group consisting of Mg, Sr, Ca and Ba and x ranges from 0.99 to about 0.7. Finally, a ceramic composition having the empirical formula $LaCr_xS_{1-x}O_4 \cdot yH_2O$ having a huttonite structure is also disclosed.

6 Claims, No Drawings

PREPARATION OF LANTHANUM CHROMITE POWDERS BY SOL-GEL

This application is a division of application Ser. No. 07/515,787 filed Apr. 25, 1991, now U.S. Pat. No. 5,061,402, which is a continuation of application Ser. No. 07/300,013 filed Jan. 23, 1989, abandoned, which is a division of application Ser. No. 07/111,907 filed Oct. 23, 1987, now U.S. Pat. No. 4,830,780.

BACKGROUND OF THE INVENTION

Solid oxide fuel cell (SOFC) technology has considerable promise for meeting many long-term, worldwide energy requirements. This technology uses cheap, readily available fuels, such as hydrogen, methane or simple alcohols. Its highly efficient power production capabilities give rise to outstanding opportunities for this technology as a future energy source for many commercial, aerospace and defense-related applications. In order to be successful, however, methods must be developed for fabricating solid oxide fuel cells reliably and cost effectively.

One fuel cell design employs thin ceramic components in a honeycomb structure. The honeycomb structure consists of thin layers of four components: 1) anode; 2) electrolyte; 3) cathode; and, 4) interconnect. Although this design results in markedly improved performance, it also multiplies the technical difficulties in fabricating these multicomponent substrates. The usual method of fabrication is to form thin layers of the pure components and to heat the multilayer structure at a high temperature.

Of particular importance is the ceramic material that is used as an interconnect material. Four materials that are currently used in solid oxide fuel cell designs include Mg doped $LaCrO_3$, Sr doped $LaMnO_3$, $Ni/ZrO_2$ and $CaO/ZrO_2$. Of these materials, Mg doped $LaCrO_3$ presents significant difficulties due to its low availability, high cost and a high sintering temperature. Typical sintering conditions required to sinter $LaCrO_3$ or Mg doped $LaCrO_3$ to full density (or closed porosity) are extremely low oxygen partial pressures and a temperature of 1750° C. The low oxygen partial pressure is needed to reduce volatilization of chromium due to oxidation which has been found to inhibit the sintering of this material. See L. Groupp and H. U. Anderson, *J. Amer. Ceram. Soc.*, Vol. 59, No. 9-10, 449-50 (1976). The high sintering temperature is very restrictive since heating the multilayer structure to temperatures necessary to sinter the $LaCrO_3$ or Mg doped $LaCrO_3$ often results in failure (cracking) of the multilayer substrate. The development of lanthanum chromite powders capable of sintering to full density, i.e., 95% of theoretical density, below 1700° C. is critical to reduce Cr volatilization problems and improve fuel cell fabrication.

One example of a method of manufacturing lanthanum chromite ($LaCrO_3$) electrodes is disclosed in U.S. Pat. No. 3,974,108. This patent discloses that strontium doped $LaCrO_3$ can be produced by preparing a slurry of lanthanum oxide, strontium carbonate and chromic acid, drying said slurry in air and then preferably calcining at a temperature of 1200° to 1500° C. to give a strontium doped $LaCrO_3$ powder. Sintering of this material occurs at temperatures above 1700° C.

Attempts to lower the sintering temperature of this material by adding fluxes have had limited success. A key drawback of this approach is the deleterious effect the added flux(es) can have on the materials present in the other layers, especially on their electrochemical properties and thermal expansion coefficients.

An alternative approach is to use sol-gel technology to prepare high surface area, reactive $LaCrO_3$ powders that sinter to full density below 1700° C. The reduction in sintering temperature is accomplished by controlling the size, composition, morphology, homogeneity, and reactivity of the material. Such control is achieved by tailoring the solution chemistry and powder processing parameters. One such method for preparing $LaCrO_3$ (lanthanum chromite) precursors is disclosed in U.S. Pat. No. 3,330,697. This process involves dissolving two or more metal salts (i.e., carbonates, hydroxides) in citric acid and ethylene glycol. The resulting sol is then filtered, dried to a gel, and calcined to remove the organics. However, this process results in some residual carbon being present in the material which can have a detrimental effect on the sintering properties of the material.

An alternate procedure has been disclosed by C.N.R. Rao et al. "Synthesis of Complex Metal Oxides Using Hydroxide, Cyanide and Nitrate Solid Solution Precursors", Journal of Solid State Chemistry, Vol. 58, 29-37 (1985). The method consists of coprecipitating a solid solution of isostructural La and Cr hydroxides and produces highly homogeneous intimate mixtures of these two elements. The solid solution precursor, $LaCr(OH)_6$, can be converted to $LaCrO_3$ by subsequent calcination at 850° C. for 12 hours.

Specifically, Rao et al. teach the precipitation of $La_{0.5}Cr_{0.5}(OH)_3$ by adding an aqueous nitrate solution of the metal ions to a sodium hydroxide (NaOH) solution. Rao also teaches that in order to reduce sodium contamination, the gel must be washed extensively with hot water. As will be shown in greater detail herein, we attempted to prepare lanthanum chromite by Rao's method and found that even after extensive washing with hot water, a small quantity (about 0.02 weight percent) of sodium was present in the gel. While seemingly low, even this amount of sodium is sufficient to markedly change the solid state chemistry of the gel. Further, if a magnesium doped material is desired, the extensive washing required to remove sodium ions can also result in marked leaching of magnesium from the gel resulting in gels with poorly controlled stoichiometry.

Rao et al. additionally disclose that ammonium hydroxide can be used to precipitate the hydroxides. However, only $La_{0.5}Al_{0.5}(OH)_3$ was prepared using ammonium hydroxide and Rao states that when divalent metals are desired, the method using ammonium hydroxide does not work. Thus, Rao teaches that ammonium hydroxide cannot be used to precipitate a compound containing divalent metal such as magnesium.

In marked contrast to Rao's teachings, we have surprisingly found that ammonium hydroxide can be used to precipitate an hydroxide salt having the empirical formula $LaCr_xA_{1-x}(OH)_6$, where A is a divalent metal such as magnesium, strontium or barium and which can be converted to $LaCr_xA_{1-x}O_3$. We have thus prepared a compound by a process which the prior art taught would not produce such a compound.

In addition, the process of the instant invention produces a product which has several advantages over the product of the prior art. For example, we have found that the process of the prior art gave a gel which upon calcining at 600° C. produced a multiphase mixture of La$_2$CrO$_6$, Cr$_2$O$_3$ and La$_2$O$_3$. Surprisingly, the process of the instant invention gave a single phase product, e.g. LaCrO$_4$ or LaCr$_{0.95}$Mg$_{0.05}$O$_4 \cdot 0.04$H$_2$O. More surprisingly, the product of the instant invention has a huttonite structure. A huttonite structure is an unusual structure first described by P. Hutton in "Huttonites, A New Monoclinic Thorium Silicate", *American Mineralogy*, Volume 36, 60-65 (1951). Although it is known that LaCrO$_4$ has a huttonite structure, (H. Schwarz, Z. Anorg. Allgem. Chem. 322, 1-14 (1963); M. D. Vasileha et al. Dapov. Akad. Nauk Ukr. RSR, Ser. B: Geol., Khim. Biol. Nauki 1977, (5), 410-13.) the prior art does not disclose that LaCr$_{0.95}$Mg$_{0.05}$O$_4 \cdot 0.04$H$_2$O has a huttonite structure.

Upon further calcining the above products at 900° C. in air, the product of the prior art produced a powder having a La$_2$CrO$_6$ and a LaCrO$_3$ phase, whereas the product of the instant invention produced only LaCrO$_3$. The physical characteristics of these powders were also observed to be drastically different. The process of the prior art gave a powder with a melted type morphology, and 5-10 micron particles which could not be reduced by intensive milling. In marked contrast, the process of the instant invention gave a powder with a porous and vermicular microstructure and 5-10 micron particles which were quickly reduced to particles of about 0.5 microns.

The smaller particle size and single phase of the powder gives three very desirable results. First the smaller particle size of the powder allows the powder to be sintered into a ceramic article (having a density of at least 95% of theoretical density) at a lower temperature than a powder with larger particles. Secondly, a multiphase powder, i.e., La$_2$CrO$_6$ and LaCrO$_3$, will affect the thermal expansion coefficient of the final ceramic articles. If the thermal expansion coefficient does not match that of the other components of the fuel cell, the entire fuel cell may fail upon repeated thermal cycling. Therefore, it is critical to have a single phase powder. Third, the multiphase powder does not have the proper electrical properties for use as an interconnect material, while the single phase powder does possess the desired electrical properties.

Thus, the instant invention differs surprisingly and significantly from the prior art in that the instant invention: 1) provides a process using ammonium hydroxide for preparing a ceramic powder precursor having a huttonite structure; 2) provides a huttonite compound which can be used to prepare a ceramic powder which has a single phase and smaller particles than that of the prior art and 3) said ceramic powder is sinterable to 95% of theoretical density at a lower temperature than that of the prior art.

SUMMARY OF THE INVENTION

This invention relates to a precursor of a ceramic powder, a process for preparing a precursor, and a process for preparing said ceramic powder. The ceramic precursor has the empirical formula LaCr$_x$A$_{1-x}$O$_4 \cdot y$H$_2$O where A is a metal selected from the group consisting of magnesium, strontium, calcium and barium, x ranges from 0.99 to about 0.7 and y ranges from 0 to 0.15.

Accordingly, one embodiment of the invention comprises a process for the preparation of a ceramic powder precursor having a huttonite structure and having the empirical formula LaCr$_x$A$_{1-x}$O$_4 \cdot y$H$_2$O where A is a metal selected from the group consisting of Mg, Sr, Ca and Ba, x ranges from 0.99 to 0.7, and y ranges from 0 to 0.15, said process comprising:

a) reacting a solution containing a lanthanum compound, a chromium compound and an A compound, in an atomic ratio of La:Cr:A of $1:x:1-x$, where A is a metal selected from the group consisting of Mg, Sr, Ca and Ba with a solution containing a stoichiometric excess of ammonium hydroxide thereby precipitating a hydroxide gel intermediate; and b) isolating said gel and calcining said gel in air at a temperature in the range of from about 400° to about 700° C. for a period of from about 0.5 to about 12 hours, and recovering the resultant ceramic powder precursor.

Another embodiment of the invention is a process for the preparation of a ceramic powder which is sinterable to at least 95% of theoretical density in an inert atmosphere and at a temperature from about 1625° C. to less than 1700° C., said powder having the empirical formula LaCr$_x$A$_{1-x}$O$_3$, where A is a metal selected from the group consisting of Mg, Sr, Ca and Ba, and x ranges from 0.99 to 0.7 and having a vermicular microstructure, which comprises heating in air a ceramic powder precursor, having a huttonite structure and having the empirical formula LaCr$_x$A$_{1-x}$O$_4 \cdot y$H$_2$O, to a temperature in the range of from about 700° to about 950° C., and recovering the resultant ceramic powder.

A further embodiment of the invention is a ceramic powder precursor having the empirical formula LaCr$_x$A$_{1-x}$O$_4 \cdot y$H$_2$O where A is a metal selected from the group consisting of magnesium, strontium, calcium and barium, x ranges from 0.99 to about 0.7 and y ranges from 0 to 0.15, said precursor being characterized by a high surface area ranging from about 10 to about 50 m$^2$/g and having a huttonite structure.

In a specific embodiment of the invention a ceramic powder precursor having the empirical formula LaCr$_{0.95}$Mg$_{0.05}$O$_4 \cdot 0.04$H$_2$O is prepared by: a) adding a solution containing a lanthanum salt, a chromium salt and a magnesium salt to an ammonium hydroxide solution thereby precipitating a hydroxide gel; b) calcining said gel in air at a temperature of about 600° C. for a period of 12 hours and recovering the resultant ceramic powder precursor.

These and other objects and embodiments will become more apparent after a more detailed description of the invention.

DETAILED DESCRIPTION OF THE INVENTION

As heretofore indicated, the present invention relates to a precursor of a ceramic powder, a process for preparing said precursor, and a process for preparing a ceramic powder. The ceramic precursor has the empirical formula LaCr$_x$A$_{1-x}$O$_4 \cdot y$H$_2$O, where A is a metal selected from the group consisting of magnesium, strontium, calcium and barium, x ranges from 0.99 to about 0.7 and preferably from 0.95 to 0.85 and y ranges from 0 to 0.15.

Accordingly, a first step in the process for preparing said ceramic powder precursor is reacting a solution of a lanthanum compound, a chromium compound and an A metal compound with a solution of ammonium hydroxide, where A is a metal selected from the group consisting of magnesium, strontium, calcium and barium. It is necessary that the lanthanum, chromium and A compounds be present in the solution in the same atomic ratio of La:Cr:A as that of the ceramic powder precursor. The appropriate metal compounds can be dissolved in water, an organic solvent or mixture of the two, with water being the preferred solvent.

Thus, when water is the desired solvent, any water soluble compound such as water soluble salts may be used. Such salts include, but are not limited to, the halide, acetate, nitrate, etc., salts. Examples of these salts include but are not limited to lanthanum chloride, lanthanum nitrate, lanthanum acetate, lanthanum bromide, chromium chloride, chromium nitrate, chromium acetate, chromium bromide, magnesium chloride, magnesium nitrate, magnesium acetate, magnesium bromide, calcium chloride, calcium nitrate, calcium acetate, calcium bromide, strontium chloride, strontium nitrate, strontium acetate, strontium bromide, barium chloride, barium nitrate, barium acetate and barium bromide. It is not necessary that each of the metal salts to be used have a common anion. A solution containing lanthanum nitrate, chromium nitrate and magnesium chloride can be used in preparing the ceramic precursor, although it is more convenient to use metal salts with a common anion such as the metal nitrates.

Generally, insoluble hydroxides of the desired metals are coprecipitated by mixing a solution of the desired metal compounds with a solution containing a stoichiometric excess of ammonium hydroxide. As stated above, it is necessary that the desired metal compounds be present in said solution in a concentration such that the atomic ratio of La:Cr:A is the same as that of the final material. The solution containing the metal compounds may be added to the solution containing the ammonium hydroxide or vice-versa, although not necessarily with equivalent results. It is preferred to add the solution containing the metal compounds to the ammonium hydroxide solution. Although it is preferable to have the metal compounds dissolved in one solution, separate solutions of each metal compound can be prepared and simultaneously added to the ammonium hydroxide solution. Alternatively, anhydrous ammonia may be added to the solution of the desired metal compounds forming ammonium hydroxide in situ and thereby precipitating the metal hydroxides.

The precipitate, i.e., insoluble hydroxide compound, which is formed using the method of the instant invention contains the desired metals in the same atomic ratio as the final material. Additionally, this precipitate is voluminous and gelatinous. Depending on the concentration of the metal compound solution and the ammonium hydroxide solution the resultant precipitate may be characterized as a gel. A gel is defined as an aggregation of particles into small clusters such that a three-dimensional structure is formed.

The gel which is formed is difficult to isolate by ordinary techniques such as gravity filtration. However, the gel can be isolated by such method as centrifugation, spray drying or evaporation of the solvent. For example, a basket type centrifuge can be used to isolate the gel. It is desirable to wash the gel with water if a halogen salt of the metals was used in order to remove as much of the residual halogen as possible. When washing the gel with water, care must be taken to ensure that leaching of the metals, e.g., La, Cr and Mg is minimal.

If the gel is isolated by a method other than spray drying, then the gel is dried in air at a temperature of about 70° to about 150° C. for about 8 to about 24 hours. Regardless of how the gel is dried, the resultant dried gel is then calcined in air at a temperature of about 400° to about 700° C. for about 0.5 to about 12 hours to give a ceramic powder precursor.

In a specific example of the above process, lanthanum nitrate, chromium nitrate and magnesium nitrate in a La:Cr:Mg ratio of 1:0.95:0.05 are dissolved in water. This solution is added to an aqueous solution containing a stoichiometric excess of ammonium hydroxide, thereby precipitating $LaCr_{0.95}Mg_{0.05}(OH)_6$. This precipitate/gel is isolated using a basket type centrifuge, dried at about 100° C. for about 12 hours and calcined at 600° C. for 12 hours to give a ceramic powder precursor having the empirical formula $LaCr_{0.95}Mg_{0.05}O_4 \cdot 0.04 H_2O$. This precursor is characterized as having a surface area from about 10 to about 50 $m^2/g$ and having a huttonite crystal structure.

The precursor described above can be further processed to prepare a ceramic powder as will be described herein. Additionally, said precursor can be used in a variety of applications such as a polymerization catalyst, a moisture sensor or an oxidation catalyst.

A ceramic powder having the empirical formula $LaCr_xA_{1-x}O_3$ where A is a metal selected from the group consisting of magnesium, strontium, calcium and barium and x ranges from 0.99 to 0.7, is prepared by heating in air a ceramic powder precursor, having a huttonite structure and having the empirical formula $LaCr_xA_{1-x}O_4 \cdot yH_2O$ to a temperature in the range of about 700° to about 1200° C. and preferably from about 700° to about 950° C. It is not necessary that the ceramic powder precursor be isolated before it is heated in air to said ceramic powder. The ceramic powder precursor can be obtained in situ by carrying out the process set forth above for its preparing except that the gel is heated to a temperature of about 700° to about 1200° C. and preferably to a temperature of about 700° to about 950° C. When the gel reaches a temperature of about 400° to about 700° C., the ceramic powder precursor having a huttonite structure is formed, which upon further heating is converted to the desired ceramic powder.

The resultant ceramic powder has a porous vermicular-type microstructure composed of weak agglomerates with an average particle size of 5–10 microns that can be easily milled to a particle size below one micron. Specifically, the particles can be milled to a particle size ranging from about 0.1 to about 0.8 microns in diameter. Lanthanum chromite powders produced by the prior art method cannot be milled to such a small particle size. The advantage to having small particles is that the sintering temperature of a ceramic powder varies inversely with particle size. Therefore, the smaller the particle size, the lower the temperature which is required to sinter the powder into a solid ceramic structure. This means that a multilayer substrate for use in solid oxide fuel cells can be fabricated at reduced temperatures, thereby markedly reducing the probability of crack formation during processing of the substrate.

The ceramic powder of the present invention is sinterable to at least 95% of theoretical density by heating said powder in an inert atmosphere at a temperature from about 1625° C. less than 1700° C. It is necessary to employ an inert atmosphere during the sintering in order to prevent the volatilization of chromium. Illustrative of the inert atmospheres which can be used are argon, nitrogen, and $CO_2/CO$. Prior to sintering, the ceramic powder can be formed into any desirable shape by means well known in the art such as uniaxial pressing, extrusion, roll pressing, etc. For example the ceramic powder can be formed into a tape by mixing the powder with a binder and then roll pressing the mixture to give a thin tape (0.05 inches thick). This tape is then sintered at about 1650° C. in an inert atmosphere.

In order to more fully illustrate the advantages to be derived from the instant invention, the following examples are set forth. It is to be understood that the examples are only by way of illustration and are not intended as an undue limitation on the broad scope of the invention as set forth in the appended claims.

EXAMPLE I

This example presents the preparation of $LaCrO_3$ by the conventional method of Rao et al. In a container 250 milliliters of a 1M lanthanum nitrate solution was mixed with an equal volume quantity of a 1M chromium nitrate solution. The resultant blue-green solution was placed in a 1 L separatory funnel and added dropwise to 500 milliliters of 6M NaOH (120 g NaOH in 500 mL water). The addition of the nitrate solution resulted in the immediate formation of a green fluffy precipitate/gel. Addition of the 500 mL nitrate solution required 45 minutes. The resulting mixture was vigorously stirred for three hours and then poured into a basket type centrifuge. The voluminous precipitate, which resisted conventional (gravity) filtration methods, was easily isolated using the basket centrifuge. The recovered precipitate was then extensively washed three times with hot deionized water, centrifuged, and placed in a large evaporating dish. The precipitate was dried at 100° C. overnight. During drying the precipitate shrank substantially. The dried precipitate was heated to 900° C. in air for 12 hours and the resultant powder recovered. Part of the powder was used to perform an x-ray diffraction analysis. The analysis showed that the powder consisted of a mixture of $LaCrO_3$ and $La_2CrO_6$. Therefore, the conventional method of preparing $LaCrO_3$ produced a mixture of $LaCrO_3$ and $La_2CrO_6$. A mixed phase is undesirable since the $La_2CrO_6$ does not have the same electrical conductivity as $LaCrO_3$ and also affects the sintering properties of the material. This sample was ball milled for 2 minutes, using a ball mill manufactured by SPEX Products, Inc. This milling reduced the particle size to greater than 3 microns. This sample was designated Sample A.

EXAMPLE II

A $LaCrO_3$ powder was prepared by the following preferred method. Two 125 mL solutions that were 1M in lanthanum nitrate and chromium nitrate respectively were mixed together to give a blue-green solution. This solution was added dropwise to a 6M solution of $NH_4OH$ (250 mL). The precipitate which formed was a distinct blue color. This precipitate was isolated as in Example I and washed once with hot deionized water prior to drying. The precipitate was dried at 100° C. overnight. After drying, the precipitate was calcined in air at 900° C. for 12 hours and the resultant powder recovered. A sample of the powder was removed and subjected to x-ray diffraction analysis. The results of this analysis showed that the powder consisted entirely of $LaCrO_3$. Therefore, the instant invention produces a pure $LaCrO_3$ powder. This sample was milled for 2 minutes, which reduced the particle size to less than one micron. This sample was designated sample B.

EXAMPLE III

A $LaCrO_3$ ceramic powder doped with magnesium was prepared using the following procedure. 50 mL of a 1M solution of lanthanum nitrate was mixed with 50 mL of a solution that was 0.95M in chromium nitrate and 0.05M in magnesium nitrate. The resulting solution was then added to a solution of $NH_4OH$ prepared by combining 77.8 mL of concentrated ammonium hydroxide with 100 mL of water. The precipitate which formed was isolated, washed with hot water, and placed in a 100° C. oven overnight to dry. A 10 g sample of this material was fired in air at 900° C. for 12 hours.

The average particle size of this material as measured by laser light scattering (Leeds and Northrup Small Particle Analyzer) was found to be 10.97 microns. A small sample of this material was milled for two minutes which reduced the average particle size of the material to 0.6 microns. This sample was designated sample C.

EXAMPLE IV

Two 1M solutions of lanthanum and chromium nitrate (500 mL ea.) were prepared in deionized water and combined with stirring to give a blue-green colored solution. This solution was added dropwise into a 6M $NH_4OH$ solution (388 mL). The resulting blue-purple precipitate gel was isolated by centrifugation and dispersed in 1000 mL of hot distilled water. The dispersion was again centrifuged and the gel dried in an oven at 100° C. for 12 hours.

The dried gel was placed in an alumina tray and calcined in air at 900° C. for 12 hours. The material, after firing, had a light green color. A small amount of the powder was dispersed in pH 10 water and put in a sonic bath for two minutes. The average particle size of the material as measured by laser light scattering was 1.04 microns. A small portion of the material was milled for two minutes dispersed in pH 10 water, and reexamined by laser light scattering. The average particle size of the milled material remained at 1.03 microns. This sample was designated sample D. Comparing Example III with Example IV, it is observed that the addition of magnesium (Sample C) results in a final product with smaller particles than when no magnesium is present (Sample D).

EXAMPLE V

A sample of $LaCrO_3$ was purchased from Cerac (Stock Number L-1149; Lot 7355-A-1). This sample was milled for two minutes and dispersed in pH 10 water. The average particle size of this sample was 1.74 microns. This sample was designated sample E.

EXAMPLE VI

A solution of 43 g of lanthanum nitrate in 100 mL of water was added with stirring to a 100 mL solution containing 38 g of chromium nitrate and 1.28 g of magnesium nitrate. This solution was then added dropwise to 350 mL of 6M $NH_4OH$. The resulting precipitate was filtered, washed with 600 mL of hot deionized water and isolated by centrifugation. The blue green precipitate was dried at 100° C. and sieved (100 mesh) to give 32.29 g of product. A series of calcinations were conducted on this material over temperatures ranging from 200°–900° C. The results are summarized in Table I.

TABLE I

| Sample I.D. | Sample Size | Final Temperature | Time | % Weight Loss | Structural Phase |
|---|---|---|---|---|---|
| F | 2 g | 200° C. | 12 hr | 12.5 | Amorphous |
| G | 2 g | 400° C. | 12 hr | 24.0 | Amorphous + Huttonite |
| H | 2 g | 600° C. | 12 hr | 27.5 | Huttonite |
| I | 2 g | 800° C. | 12 hr | 32.5 | Perovskite |

Sample H was further calcined to 900° C. to yield a magnesium doped lanthanum chromite powder similar to sample I. This sample was designated sample J. A small sample of sample J was milled for two minutes and dispersed in pH 10 water. The average particle size of this material was 0.68 microns.

EXAMPLE VII

Samples A, B and C were examined by a scanning electron microscope. The micrographs showed that samples B and C exhibited an irregular, vermicular type of morphology consisting of large (5 microns) porous agglomerates. In contrast, sample A, which was prepared by the conventional process, consisted of large (>10 microns) particles with smooth surfaces.

The samples from Example VI were analyzed by x-ray diffraction. This analysis revealed the unexpected presence of a new compound between 400°-700° C. possessing what is known as a huttonite structure. Extensive characterization of this material by chemical analysis, IR, TGA/Mass Spectrometry and XPS determined that sample H has the empirical formula $LaCr_{0.95}Mg_{0.05}O_4 \cdot 0.04H_2O$. Sample I which was calcined at 800° C. exhibited an x-ray pattern consistent with the formula $LaCr_{0.95}Mg_{0.05}O_3$.

EXAMPLE VIII

Powder samples from Samples C and E were milled for three minutes. The powders were uniaxially pressed into the form of disks and placed into a Lindberg tube furnace under an argon atmosphere. A tray containing graphite powder was placed upstream of the pressed pellets in order to help reduce the oxygen content of the argon atmosphere to assist sintering.

Disks of samples C and E were fired according to the following schedule: Room Temperature to 1000° C. (5.5 hrs), 1000° to 1350° C. (3 hrs), 1350° C. (12 hrs), 1350° C. to Room Temperature (7.5 hrs). Upon heating to 1350° C. sample C (Mg doped $LaCrO_3$) increased in density from 56 to 67% of theoretical density while sample E (commercial $LaCrO_3$) changed only slightly from 61 to 63%.

EXAMPLE IX

To show the utility of the product from the process described in this invention, sample B was fabricated into a tape that can be used in a solid oxide fuel cell by the following procedure. A mixture of 96.55 g of $LaCrO_3$ powder, 3.74 g of polyvinylbutyral (PVB) and 4.2 g of plasticizer was added to the mixing chamber of a rheometer which was maintained at 98° C. via a recirculating ethylene glycol bath. In order to improve the mixing further, 7 mL of hexanol was added to the mixture. The binder plus powder dispersion was fed through two rollers that were steam heated at 95° C. The thickness of the sheet was gradually reduced by decreasing the distance between the roller until a sheet thickness of 0.05 inches was achieved.

A sample of the tape was placed in a tube furnace and heated to 1600° C. for two hours under an atmosphere of dry nitrogen. A small piece of carbon felt was placed in front of the tray to act as an oxygen trap. During firing, the tape decreased in weight (5.4%) and the density of the tape increased from 63.5% to 86% (i.e., 4.3 g/cc to 5.8 g/cc). A sample of the sintered tape was examined by scanning electron microscopy. SEM micrographs of the tape's surface revealed that the $LaCrO_3$ powder particles had sintered extensively forming irregular grains ranging from 0.5 to 1 micron in size.

EXAMPLE X

A solution of 0.8M $Cr(NO_3)_3$ and a solution of 1.4M $LaCl_3$ were separately pumped at equimolar rates into a vigorously stirred solution of ammonium hydroxide maintained at pH 10 throughout the addition. The product of this operation was an extremely fine gel. The gel was subjected to several washings via dilution with deionized water and subsequent gravity settling. After the last washing, sufficient isopropanol was added to the gel slurry to make the composition of the liquid about 20 wt. percent water. The resultant slurry was spray dried using a laboratory spray drier with nitrogen as the drier gas. The product powder had a green coloration which changed to brown after evacuation at 120° C. for 16 hours. The evacuated powder had a surface area (SA) of 163 $m^2/g$, pore volume (PV) of 0.73 cc/g, and was amorphous. Calcination of this powder in air at 550° C. for 8 hours yielded a dark green powder with SA of 24.6 $m^2/g$ and PV of 0.22 cc/g. This calcined product was found by XRD to have the huttonite crystal structure, i.e., $LaCrO_4$. Similar calcination of the evacuated powder at 880° C. for 1 hour yielded a gray-green powder that had the $LaCrO_3$ structure with crystallite size of 470 Å. Calcination of the evacuated powder at 1000° C. resulted in a product with the structure of $LaCrO_3$. Ball milling of the last product gave a powder of extremely narrow particle size distribution with average particle size of 0.72 micrometers.

EXAMPLE XI

Solutions of lanthanum acetate, chromium acetate, and magnesium acetate were made and mixed in such proportions as to give the final stoichiometry of $LaCr_{0.9}Mg_{0.105}O_3$. The solution was spray dried in a laboratory spray drier with nitrogen drier gas. Calcination of the product powder in air at 850° C. converted the powder from amorphous to crystalline with the $LaCrO_3$ structure.

EXAMPLE XII

A powder produced according to Example XI was calcined in air at 550° C. for 1 hour. A portion of the resultant powder was used to make a disk by uniaxial pressing. The dimensions of the green disk were: 12 mm diameter by 2.5 mm thick. The density of this green compact was 52.4% of the theoretical value (TD). The disk was sintered in a graphite furnace purged with argon. The furnace was heated at the rate of 200° C./h and held at 1650° C. for 4 hours. The density of the fired disk was 95.7% TD by the Archimedes method, and the XRD pattern of the sintered material was that of $LaCrO_3$.

EXAMPLE XIII

A powder produced according to Example XI was calcined in air at 850° C. for 1 hour. Two 12 mm disks were pressed and fired as per Example XII. The fired disks had densities 93.1 and 95.4% TD. The XRD pattern of the fired disks was that of $LaCrO_3$.

EXAMPLE XIV

A portion of the sample B powder was pressed into a ½ inch diameter pellet. The pellet was placed into an alumina tray and placed in a tube furnace. The tube furnace was evacuated and backfilled several times with high purity $CO_2$ and then the temperature was ramped at 2° C./min up to a temperature of 1100° C. During the heating an atmosphere of a controlled mixture of $CO/CO_2$ was passed over the pellet. The pellet was sintered for two hours at 1600° C. and then slowly cooled. The oxygen partial pressure was $10^{-10}$ atmospheres. The density of the pellet as determined by the Archimedes method was 78%. This compares to a density of only 58% reported by L. Groupp and H. U. Anderson, *J. Am. Ceram. Soc.*, 59, No. 9–10, 1976, pp. 449–550 for a pellet prepared under similar conditions.

We claim as our invention:

1. A compound having the empirical formula $LaCr_xA_{1-x}O_4 \cdot yH_2O$, where A is a metal selected from the group consisting of magnesium, strontium, calcium and barium, x ranges from 0.99 to about 0.7 and y ranges from 0 to about 0.15, said compound possessing a huttonite structure and a surface area from about 10 to about 50 $m^2/g$.

2. The compound of claim 1 where A is magnesium.

3. The compound of claim 1 where A is strontium.

4. The compound of claim 1 having the empirical formula $LaCr_{0.95}Mg_{0.05}O_4 \cdot 0.04H_2O$.

5. A method of preparing a ceramic article of lanthanum chromite having a density of at least 95% of the theoretical density comprising forming a ceramic article from a ceramic powder having the empirical formula $LaCr_xA_{1-x}O_3$ where A is a metal selected from the group consisting of magnesium, strontium, calcium, and barium, x ranges from 0.99 to about 0.7 and having a vermicular microstructure and an average particle size between about 0.1 and about 0.8 microns by a method selected from the group consisting of uniaxial pressing, extrusion and roll pressing and heating said ceramic article under an inert atmosphere at a temperature from about 1625° C. to less than 1700° C.

6. The method of claim 5 where said inert atmosphere is argon, nitrogen or a mixture of carbon dioxide and carbon monoxide.

* * * * *

UNITED STATES PATENT AND TRADEMARK OFFICE
CERTIFICATE OF CORRECTION

PATENT NO. : 5,128,284

DATED : July 7, 1992

INVENTOR(S) : Olson et al.

It is certified that error appears in the above-identified patent and that said Letters Patent is hereby corrected as shown below:

Abstract   Second to last line:   "$LaCr_xS_{1-x}O_4- \bullet yH_2O$" should read:
--$LaCr_xA_{1-x}O_4 \bullet yH_2O$--

Signed and Sealed this

Tenth Day of August, 1993

Attest:

MICHAEL K. KIRK

Attesting Officer   Acting Commissioner of Patents and Trademarks